United States Patent
Menard et al.

(10) Patent No.: US 6,307,603 B1
(45) Date of Patent: Oct. 23, 2001

(54) LOW STRESS PACKAGING FOR A DISPLAY DEVICE

(75) Inventors: Jean Pierre Menard, Fremont; Doanh D. Bui, Milpitas, both of CA (US)

(73) Assignee: Aurora Systems, Inc., San Jose, CA (US)

( * ) Notice: Subject to any disclaimer, the term of this patent is extended or adjusted under 35 U.S.C. 154(b) by 0 days.

(21) Appl. No.: 09/483,889

(22) Filed: Jan. 18, 2000

(51) Int. Cl.$^7$ .................... G02F 1/1333; G02F 1/1335
(52) U.S. Cl. ................. 349/58; 349/57; 359/819; 359/829
(58) Field of Search ............... 349/58, 57; 359/819, 359/829

(56) References Cited

U.S. PATENT DOCUMENTS

| | | | |
|---|---|---|---|
| 5,212,595 | * | 5/1993 | Dennison, Jr. et al. ............. 359/513 |
| 5,249,082 | * | 9/1993 | Newman ............................... 359/813 |
| 5,442,470 | * | 8/1995 | Hashimoto ........................... 359/83 |
| 5,486,942 | * | 1/1996 | Ichikawa et al. ..................... 359/83 |
| 5,515,188 | * | 5/1996 | Miles et al. .......................... 359/62 |
| 5,523,893 | * | 6/1996 | Haas ..................................... 359/820 |
| 5,764,314 | * | 6/1998 | Narayan et al. ...................... 349/58 |
| 5,789,879 | * | 8/1998 | Salvio .................................. 359/857 |
| 5,868,485 | * | 2/1999 | Fujimori et al. ..................... 353/119 |
| 5,988,818 | * | 11/1999 | Fujimori et al. ..................... 353/119 |

* cited by examiner

Primary Examiner—Kenneth Parker
Assistant Examiner—Mike Qi
(74) Attorney, Agent, or Firm—Henneman & Saunders; Larry E. Henneman, Jr.

(57) ABSTRACT

An LCD assembly (10) having an LCD device mounted on a substrate (12) with a flex cable and connector assembly (14) electrically and mechanically attached thereto. A mounting border (16) has a plurality of border screw holes (40) isolated from a main body (30) of the mounting border (16) by a plurality of stress relief slots (34) such that the main body (39) connects to the border screw holes (40) only through a plurality of land areas (44). An aperture mask 18 is interposed between a LCD subassembly (28) and a frame (20). The frame (20) has a lens receptor (42) for accepting a field lens (22) secured in a lens mount. Mounting screws (26) secure the mounting border (16) to the frame (20).

19 Claims, 5 Drawing Sheets

LOW STRESS PACKAGING FOR A DISPLAY DEVICE

TECHNICAL FIELD

The present invention relates to the field of electronic imaging devices, and more particularly to a method and apparatus for precision mounting of an imaging device such as a liquid crystal display ("LCD") imaging device. The predominant current usage of the inventive precision surface mount is in the surface mounting of reflective imaging devices in a multi channel projection system, wherein it is particularly important to maintain a precise relationship between a reflective surface of the LCD and a mounting surface.

BACKGROUND ART

Projection type imaging devices commonly use micro LCD imagers. Since the pixel size and spacing on these are so small, they must be precisely placed in relation to surface whereon they are mounted. Further, the imager must be kept perfectly flat, since even the slightest distortion of the imager will result in a portion of the pixels there being out of plane and/or out of alignment. Moreover, it is important to maintain the flatness of the imaging device in order to maintain uniformity of the focal plane and to enhance convergence with other such devices in the system.

Prior art mechanical attachment methods and means have secured the imager in position. However, it has been found that such prior art mechanical attachment methods will place stress on the imager which tends to cause the imager to be less than perfectly flat. It would be advantageous to have some method or means to mount such an imager, or other video display device, wherein there would be no such unwanted forces. However, to the inventor's'knowledge, no prior method or apparatus has existed which will consistently result in the precise placement of micro LCD imaging devices without causing the imaging device to at least tend toward a distorted condition. All previous methods have required some sort of rigid mechanical attachment in order to maintain the precise placement needed for such devices.

SUMMARY

Accordingly, it is an object of the present invention to provide a method and apparatus for mounting an imaging device which does not put any stress on the imaging device which might tend to deflect it and cause some distortion from its flat, unstressed condition.

It is another object of the present invention to provide a method and apparatus for mounting an imaging device which will hold the imaging device securely such that it is resistant to vibration and other external forces.

It is still another object of the present invention to provide a method and apparatus for mounting an imaging device which is easy and inexpensive to implement in a production environment.

It is yet another object of the present invention to provide a method and apparatus for mounting an imaging device which will result in a clearly focused image across the entire surface of the imaging device.

Briefly, the present invention is an apparatus for holding an LCD reflective imaging device in such a way that there is no stress induced on the device when it is attached to a mount. A frame is provided with corner flexible in such a way that the corners can be secured down without placing stress on the LCD device mounted therein. There is a mask attached to the glass window of the LCD, thereby occluding any artifacts other than the actual image area. This places the aperture mask in very close proximity to the display area. This assembly is designed in such a way that the surface area available for cooling the device is maximized, thereby allowing smaller packages with no reduction in cooling efficiency. A field lens can be added to slightly adjust the magnification of each device in a multi-channel system. The air gap between the LCD and the field lens is closed off so that there is no dust near the image area. This type of arrangement is used in an off axis 3 color projector. It can also be used in an on axis system.

An advantage of the present invention is an image is produced which is in focus in all areas of the image.

Another advantage of the present invention is that an imaging device can be mounted such that the imaging device is not distorted out of shape.

Still another advantage of the present invention is that an imaging device can be readily mounted in a production environment without damaging or stressing the image device.

Yet another advantage of the present invention is that it is easy and inexpensive to implement.

Still another advantage of the present invention is that an imaging device is securely mounted.

These and other objects and advantages of the present invention will become clear to those skilled in the art in view of the description of modes of carrying out the invention, and the industrial applicability thereof, as described herein and as illustrated in the several figures of the drawing. The objects and advantages listed are not an exhaustive list of all possible advantages of the invention. Moreover, it will be possible to practice the invention even where one or more of the intended objects and/or advantages might be absent or not required in the application.

Further, those skilled in the art will recognize that various embodiments of the present invention may achieve one or more, but not necessarily all, of the above described objects and advantages. Accordingly, the listed advantages are not essential elements of the present invention, and should not be construed as limitations.

DETAILED DESCRIPTION

Figure 1:
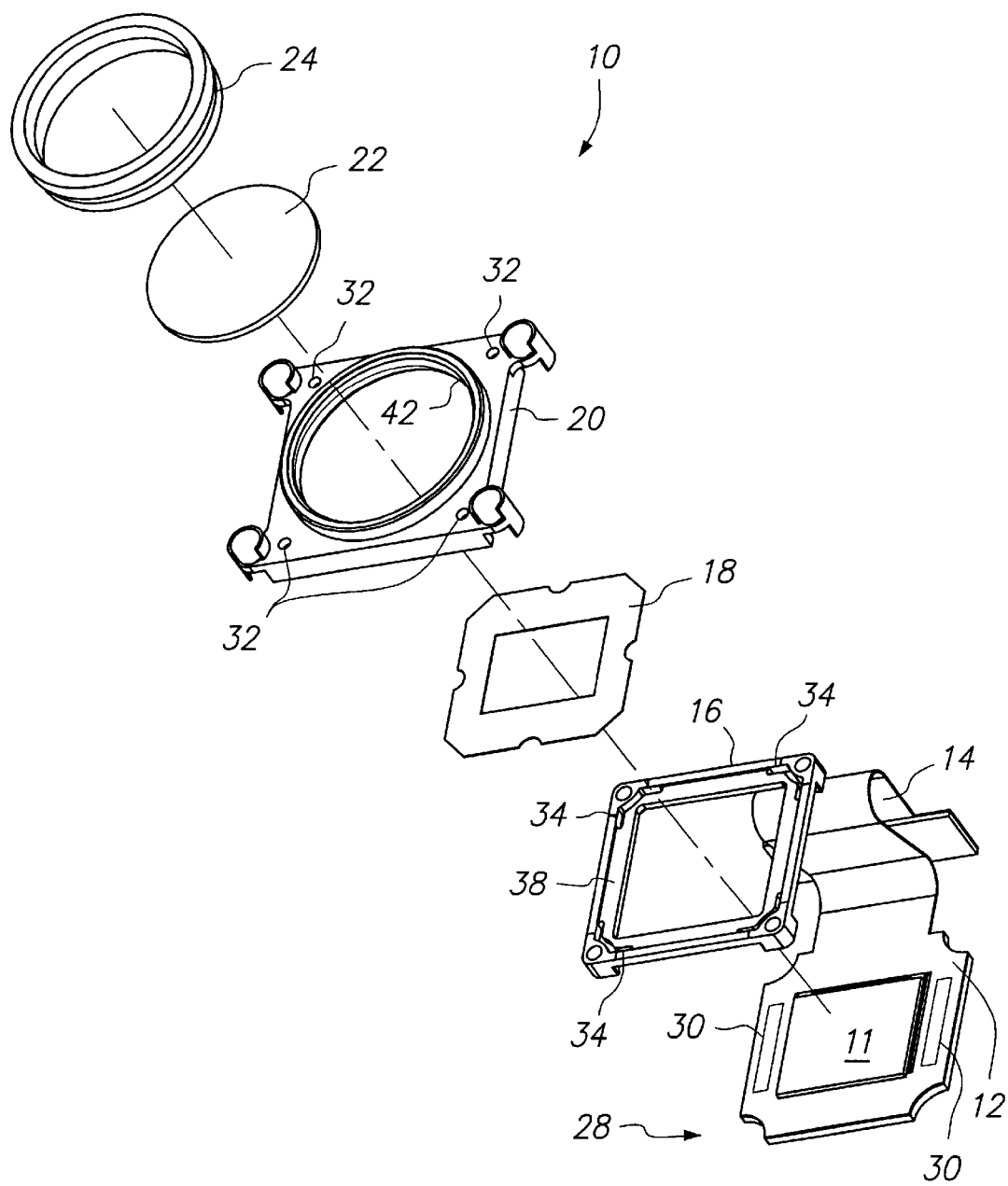
FIG. 1 is an exploded front perspective view of an LCD assembly, according to the present invention.

The embodiments and variations of the invention described herein, andlor shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

Figure 2:
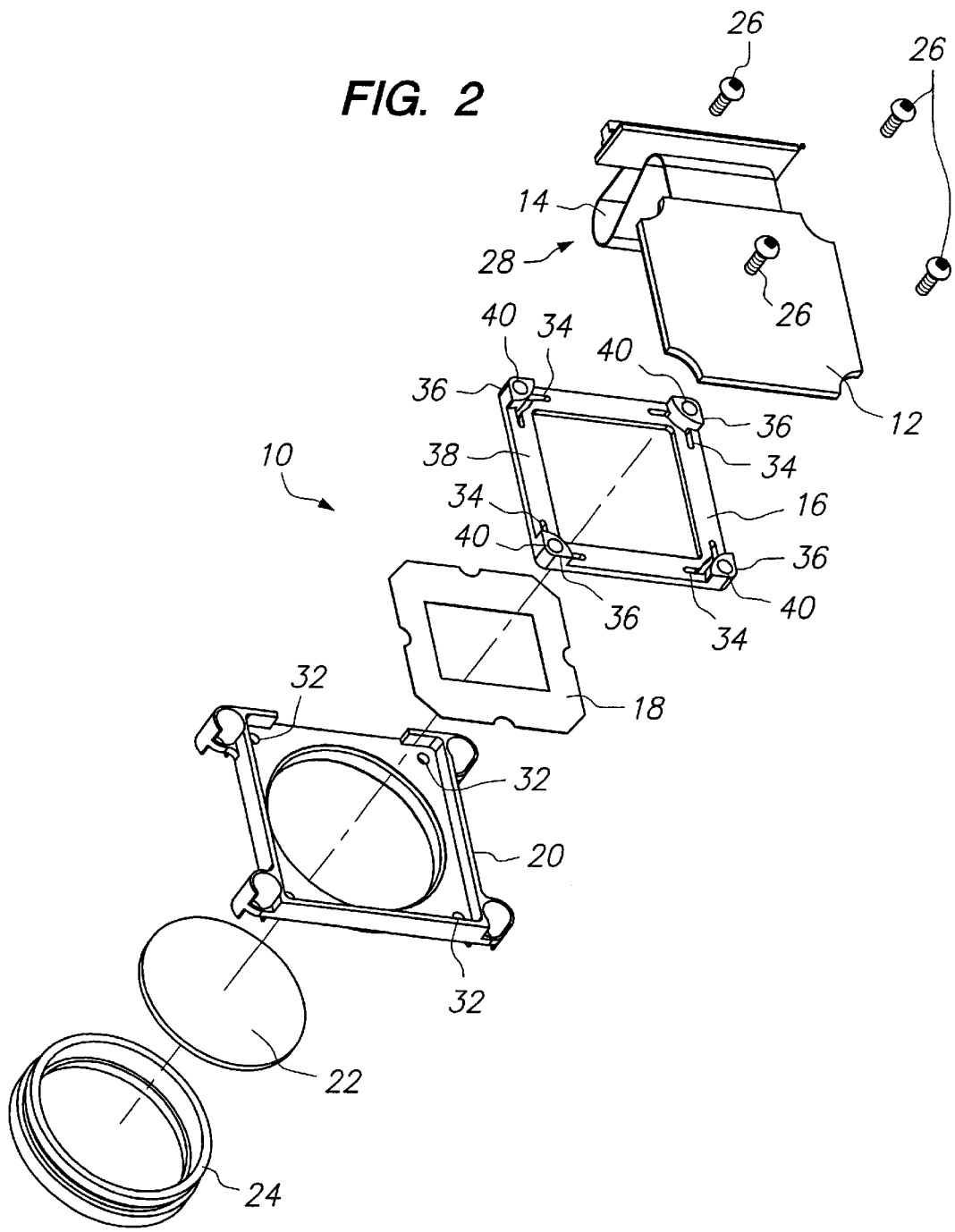
FIG. 2 is an exploded rear perspective view of the LCD assembly of FIG. 1.

One particular embodiment of the present invention is an LCD assembly for use in a multi-LCD imaging apparatus. The inventive LCD assembly is shown in an exploded front perspective view in FIG. 1 and is designated therein by the general reference character 10. FIG. 2 is an exploded rear perspective view of the LCD assembly 10 of FIG. 1. As can be seen in the view of FIG. 1 the LCD assembly has a reflective LCD device 11 mounted on a substrate 12 with a flex cable and connector assembly 14 attached thereto. A mounting border 16, aperture mask 18, frame 20, field lens 22 and lens mount 24 are also depicted in the views of FIGS. 1 and 2. In the view of FIG. 2 can be seen a plurality (four, in this example) of mounting screws 26.

According to the presently described example of the present invention 10, the LCD device 11 (FIG. 1) is mounted to the substrate 12 in a conventional manner to form an LCD subassembly 28. The LCD subassembly 28 is then affixed to the mounting border 16 using an adhesive 30. The mounting border 16, with the LCD subassembly 28 affixed thereto, is then affixed to the frame 20 using the mounting screws 26. The mounting screws 26 are screwed into a like plurality (four, in this example, of which three are visible in the view of FIG. 2) of threaded screw receptor holes 32. In the presently described example of the present invention 10, the aperture mask 18 is placed between the mounting border 16 and the frame 20 to define the desired image area.

It should be noted that the operation of securing the mounting border 16 to the frame 20, or a prior art equivalent thereof, has been likely in the prior art to stress the substrate 12 such that the LCD device 11 is less than perfectly flat across its entire surface. Given the close pixel spacing and small size of the LCD device 11, only a very small deviation from flat will result in an out of focus condition in at least part of a resulting projected image or variations in color intensity across the image. However, according to the present invention, a plurality (four, in this example) of stress relief slots 34 allow a like plurality of corresponding stand off legs 36 to move somewhat independently of a border main body 38, since the mounting border 16 of the presently illustrated example is constructed of a somewhat flexible plastic material (although the material could be of some other type, including but not limited to a metal or ceramic, provided that the other conditions as described herein are met). Therefore, when the mounting screws 28 are passed through a like plurality of border screw holes 40 and secured tight into the screw receptor holes 32 of the frame 29, the border main body 38 and attached LCD subassembly 28 remain relatively unstressed and flat.

The presently described example of the frame 20 has a threaded lens receptor 42 for accepting the threaded lens mount 24 with the field lens 22 secured therein (by an adhesive, in this present example). By the action of screwing the lens mount 24 in and out of the lens receptor 42 focus of an image from the LCD device 11 can be attained.

Figure 3:
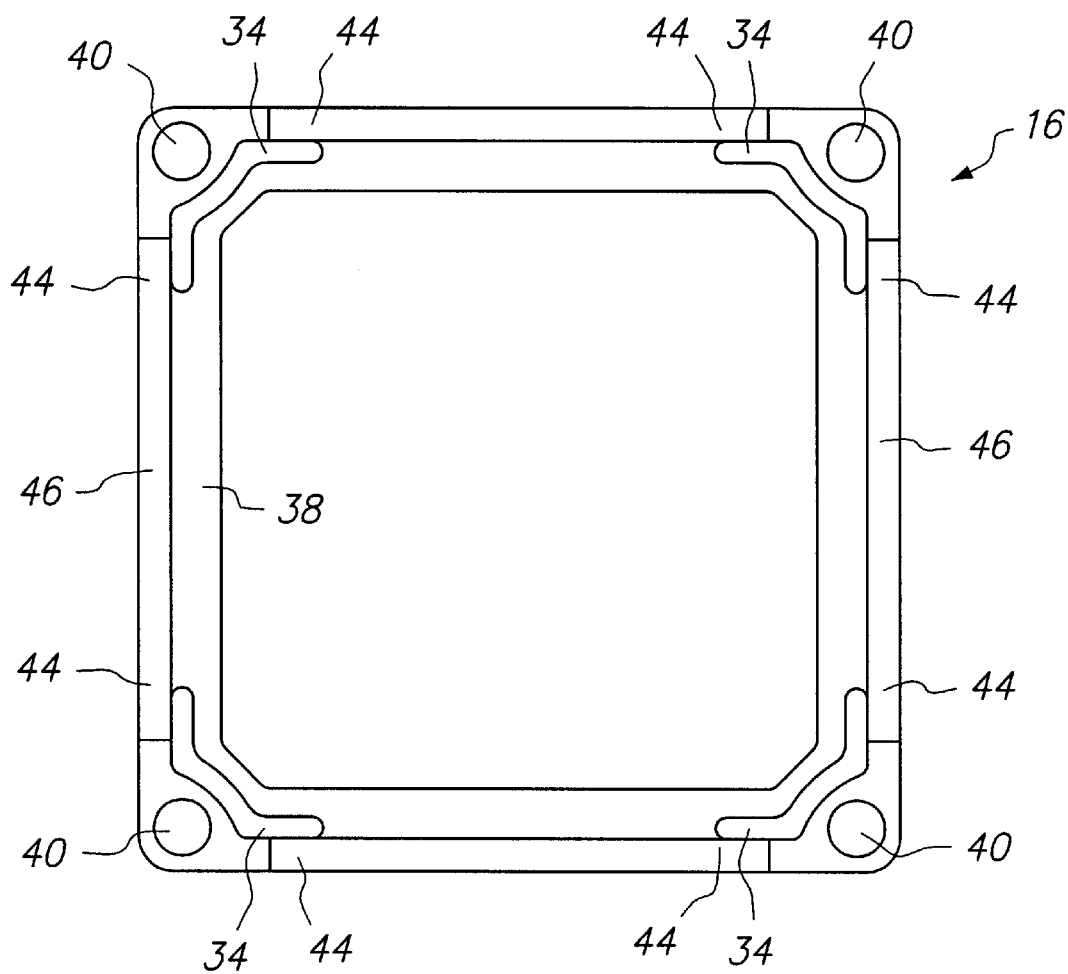
FIG. 3 is a front perspective view of the mounting border 16 of FIGS. 1 and 2.

FIG. 3 is a front perspective view of the mounting border 16 of FIGS. 1 and 2. As can be seen in the view of FIG. 3, the stress relief slots 34 are shaped and positioned such that the main body 38 of the mounting border 16 is connected to border screw holes 40 by a plurality (eight, in this present example) of land areas 44 on a border edge 46 of the mounting border 16. Since the land areas 44 are somewhat flexible, the main body 38 of the mounting border 16 is relatively isolated from stresses at the border screw holes 40, thereby allowing the main body 38, with the LCD subassembly 28 (FIG. 1) affixed thereto, to remain flat even if the border edge 46 is stressed somewhat out of flat when the mounting screws (FIG. 2) are screwed tight into the screw receptor holes 32 (FIG. 2).

Figure 4:
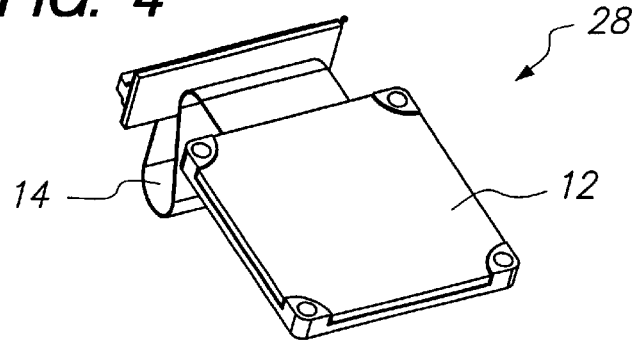
FIG. 4 is a rear perspective view of an LCD subassembly, according to the present invention.
Figure 5:
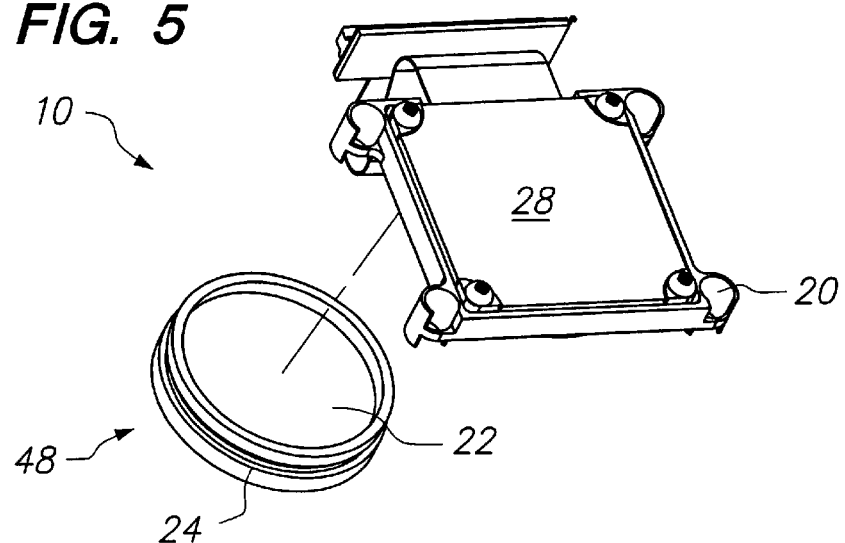
FIG. 5 is an exploded rear perspective view of the complete LCD assembly of FIG. 2.
Figure 6:
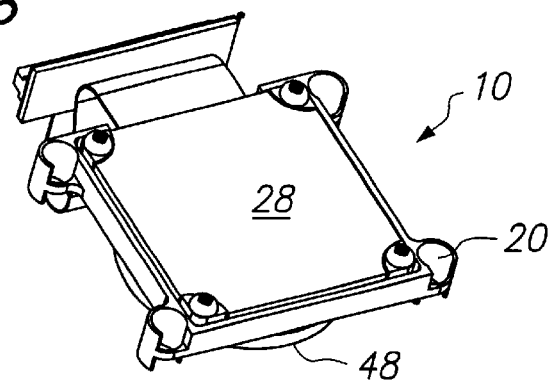
FIG. 6 is a rear perspective view of an assembled LCD assembly.

The following additional views of the invention are provided to more fully illustrate several aspects of the assembly of the LCD assembly 10. FIG. 4 is a rear perspective view of the LCD subassembly 28 showing the LCD device 11 (not visible in the view of FIG. 4) affixed to the substrate 12 and the attached flex cable and connector assembly 14. FIG. 5 is an exploded rear perspective view of the partly assembled LCD assembly 10, showing a lens assembly 48 detached therefrom. The lens assembly 48 has the field lens 22 affixed to the lens mount 24, as discussed previously herein. FIG. 6 is a rear perspective view of the fully assembled LCD assembly 10, showing the lens assembly 48 affixed to the frame 20.

Figure 7:
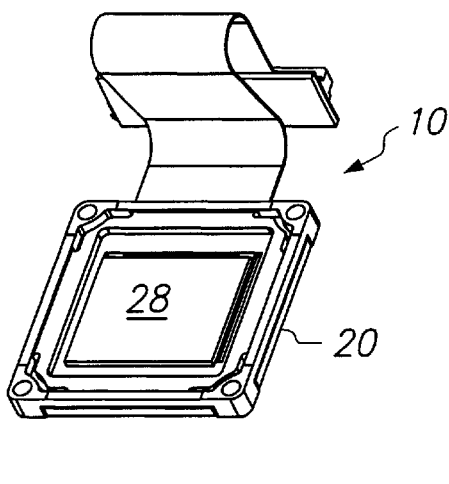
FIG. 7 is a front perspective view showing an LCD subassembly affixed to a border.
Figure 8:
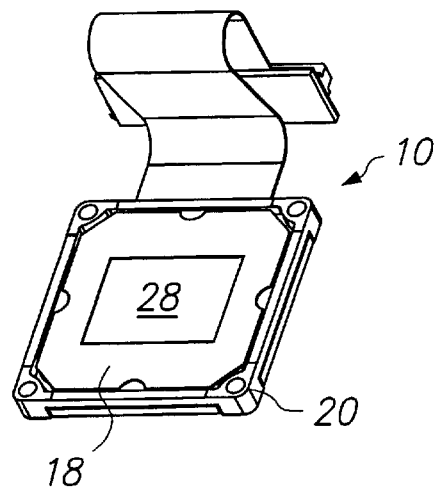
FIG. 8 is a front perspective view, similar to FIG. 7, showing the border and LCD subassembly combination with an aperture mask placed thereon.
Figure 9:
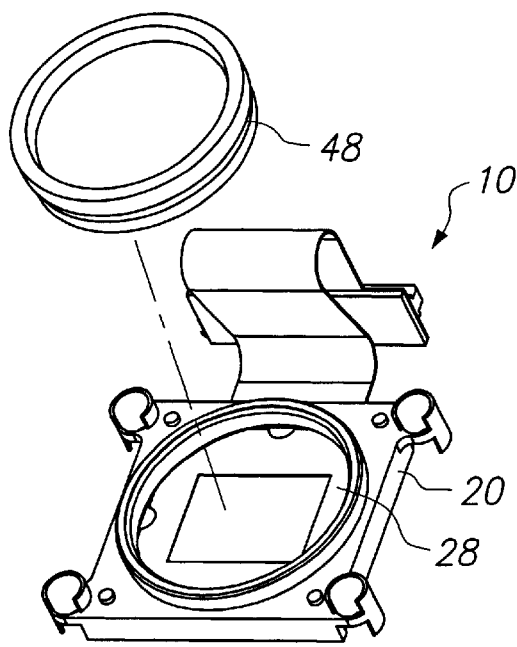
FIG. 9 is an exploded front perspective view of the complete LCD assembly of FIG. 2.
Figure 10:
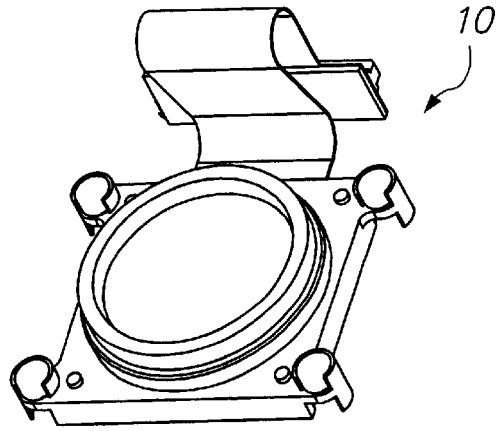
FIG. 10 is a front perspective view of the complete LCD assembly of FIG. 2.

FIG. 7 is a front perspective view of the frame 20 with the LCD subassembly 28 affixed thereto. FIG. 8 is a front perspective view of the assembly of FIG. 7 with the aperture mask 18 thereon. placed thereon. FIG. 9 is an exploded front perspective view of the complete LCD assembly 10, showing the lens assembly 48 removed therefrom, and FIG. 10 is a front perspective view of the assembled complete LCD assembly 10.

Various modifications may be made to the invention without altering its value or scope. For example, it will be noted that the shape and quantity of components, as described herein in relation to the example of the invention her presented, are not a critical part of the invention. Indeed, it is anticipated that different applications will require the modification of the invention is aspects such as quantity, size, and shapes of particular component aspects.

All of the above are only some of the examples of available embodiments of the present invention. Those skilled in the art will readily observe that numerous other modifications and alterations may be made without departing from the spirit and scope of the invention. Accordingly, the disclosure herein is not intended as limiting and the appended claims are to be interpreted as encompassing the entire scope of the invention.

Industrial Applicability

The LCD assembly 10 is intended to be widely used in the construction of projection type imaging devices. Currently, the invention is being applied to the construction of multi channel imaging devices using reflective type LCD devices 11 such that three of the LCD assemblies 10 are employed in each such imaging device. However, it is within the scope of the invention that other types of display devices (not shown) could be employed, and other types of imaging engines constructed, according to the present inventive method.

The inventors have discovered that application of the present invention provides for an LCD assembly 10 wherein there is no detectable distortion transferred to the LCD device 11 from the mounting stresses. This means that there was less than 20 nanometers of deflection induced on the LCD device 11. The inventive mounting border 16 effectively decouples the LCD device 11 from the mechanical stresses induced from mounting the device at the system integration level.

According to the present invention, the imaging aperture mask 18 can be aligned to the active area on the LCD device 11 to a high degree of accuracy. The field lens 22 can be adjusted axially to control magnification. The complete assembled LCD assembly 10 provides a dust tight air gap between the LCD device 11 and the field lens 22. Accordingly, the construction is such that any dust particulate is excluded from the airspace between the field lens and the display device. The non-imaging side of the LCD device 11 is optimized for cooling, since the substrate 12 is not obstructed on that side.

According to the present invention, convergence to sub-pixel accuracy over the entire image is made possible. The magnification and focus of the image in each channel can be adjusted slightly to accommodate manufacturing tolerances in the lenses and display devices.

Since the micro LCD attachment apparatus 10 of the present invention may be readily produced and integrated with existing video creation and display systems and devices, and since the advantages as described herein are provided, it is expected that it will be readily accepted in the industry. For these and other reasons, it is expected that the utility and industrial applicability of the invention will be both significant in scope and long-lasting in duration.

What is claimed is:

1. A display device assembly, comprising:
   frame;
   a substrate;
   a display device affixed to a substrate; and
   a mounting border affixed to the substrate, the mounting border having at least one attachment structure for fixing the mounting border to the frame, and at least one stress relief aperture disposed between the attachment structure and the portion of mounting border affixed to the substrate to prevent stress caused by fixing the mounting border to the frame from deforming the substrate.

2. The display device assembly of claim 1, wherein:
   the mounting border is affixed to the frame using a plurality of screws.

3. the display assembly of claim 1, wherein:
   the substrate is affixed to the mounting border by an adhesive.

4. The display device assembly of claim 1, and further including:
   an aperture mask interposed between the frame and the mounting border.

5. The display device assembly of claim 1, wherein:
   the frame includes a lens receptor adapted for accepting a field lens.

6. The display device assembly of claim 1, and further including:
   a field lens assembly affixed to the frame.

7. The display device assembly of claim 6, wherein:
   the field lens assembly is screwed into a threaded lens receptor on the frame such that the field lens can be focused by rotating the field lens relative to the frame.

8. The display device assembly of claim 6, wherein:
   the field lens assembly includes a lens affixed within a lens mount.

9. The display device assembly of claim 1, and further including:
   a flexible cable and connector assembly affixed to the substrate.

10. The display device assembly of claim 1, wherein:
    the mounting border is generally rectangular in shape;
    the mounting border includes a mounting screw hole near each corner of the mounting border; and
    each mounting screw hole is isolated from a main body of the mounting border by one of the stress relief apertures.

11. The display device assembly of claim 1, wherein:
    said stress relief aperture is a slot positioned generally diagonally across a corner of the mounting border.

12. The display device assembly of claim 1, wherein:
    said stress relief aperture at least partially separates a corner of the mounting border from a main body of the mounting border.

13. A mounting border for mounting a display device subassembly to another structure, comprising:
    a main body adapted for accepting the display device subassembly;
    at least one mounting hole adapted for securing the mounting border to the other structure therethrough; and
    a stress relief slot for at least partially isolating the main body from the mounting hole;
    whereby stress resulting from securing the mounting border to the other structure is prevented from deforming the display device subassembly.

14. A mounting border of claim 13, wherein:
    the mounting border includes four mounting holes and four stress relief slots.

15. The mounting border of claim 13, wherein:
    the display device subassembly is affixed to the mounting border using an adhesive.

16. The mounting border of claim 13, wherein:
    the stress relief slot is between the mounting hole and the main body of the mounting border.

17. The mounting border of claim 13, wherein:
    the mounting border is adapted for mounting on a frame using a screw placed through the mounting hole and into the frame.

18. The mounting border of claim 13, wherein:
    the stress relief slot is positioned generally diagonally near a corner of the mounting border.

19. The mounting border of claim 13, wherein:
    the mounting hole is connected to the main body by at least one land.

* * * * *

UNITED STATES PATENT AND TRADEMARK OFFICE
CERTIFICATE OF CORRECTION

PATENT NO. : 6,307,603 B1
DATED : October 23, 2001
INVENTOR(S) : Menard et al.

It is certified that error appears in the above-identified patent and that said Letters Patent is hereby corrected as shown below:

Column 5,
Line 40, please replace "frame;" with -- a frame; --.
Line 42, replace "affixed to a substrate;" with -- affixed to the substrate; --.
Line 47, replace "the portion of mounting border" with
-- the portion of the mounting border --.

Signed and Sealed this

Second Day of April, 2002

Attest:

JAMES E. ROGAN
Attesting Officer        Director of the United States Patent and Trademark Office